March 28, 1939. K. FEILCKE 2,152,543
CONTROL MECHANISM FOR MOTOR VEHICLES
Filed Feb. 19, 1937
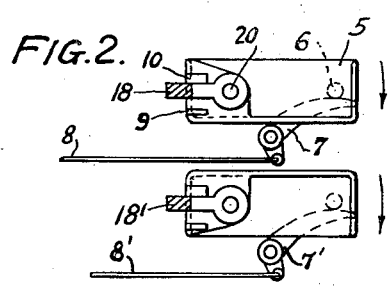
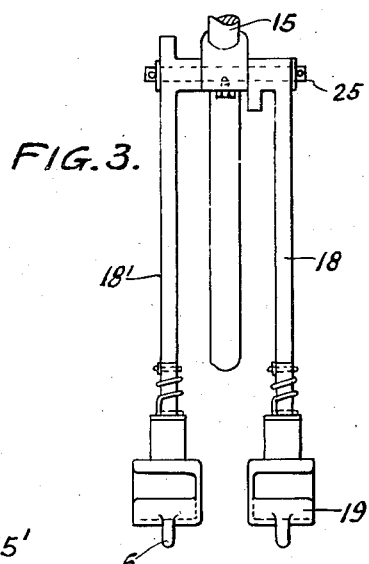
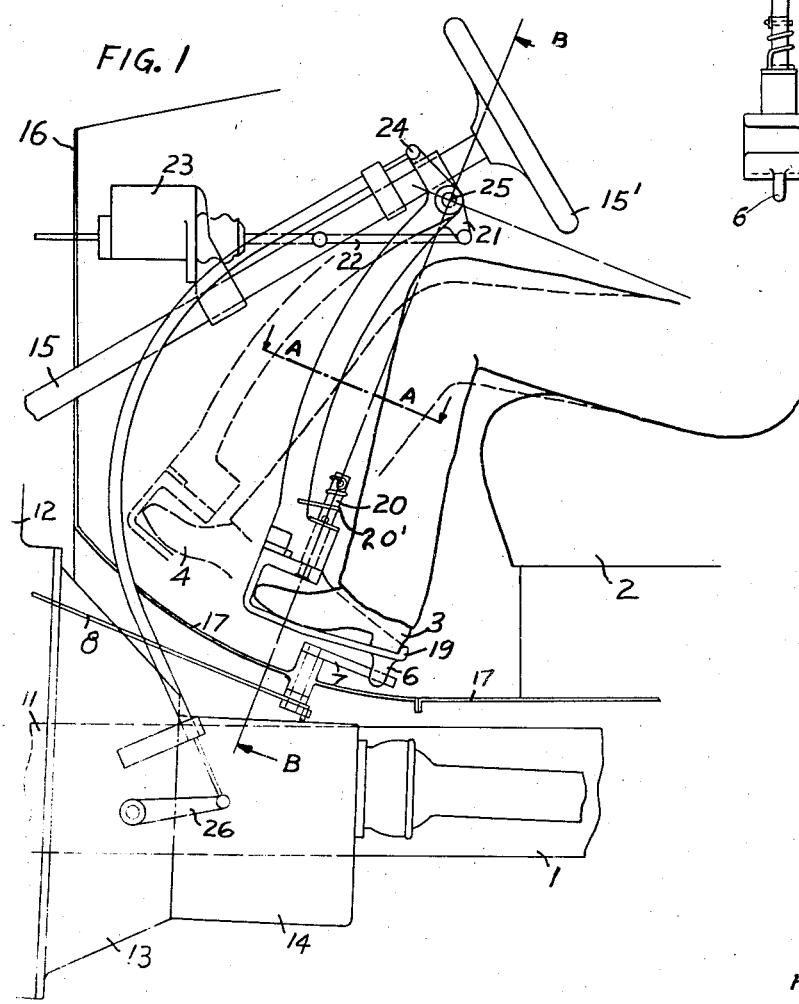
INVENTOR.
KARL FEILCKE
BY Edwin Guthrie
ATTORNEY.

Patented Mar. 28, 1939

2,152,543

UNITED STATES PATENT OFFICE 2,152,543

CONTROL MECHANISM FOR MOTOR VEHICLES

Karl Feilcke, Indianapolis, Ind.

Application February 19, 1937, Serial No. 126,717

15 Claims. (Cl. 192—3)

This invention relates to the foot operated control mechanism of automobile vehicles, which on cars as usually constructed consists of three pedals, one actuated by the left foot for controlling the clutch, and the other two for governing the acceleration and for applying the brakes of the car. As the accelerating and braking never take place at the same time, the two pedals concerned are alternately moved by the right foot. In addition, the head light dimming devices and the motor starter switch buttons are in many machines arranged to be moved by the left and right foot respectively.

It is a characteristic feature of this customary pedal arrangement, that the pedals always turn upon fulcrums located below the driver's feet, and frequently the three pedal pads are not in the same plane. To attain the desired leverage in the clutch and brake linkage, the clutch and brake pedal pads must travel about 8 inches and are, therefore, raised about that distance above the floor, while the accelerator pedal pad is situated close to the floor, in order to give the most comfortable and natural position for the driver's leg. This generally used arrangement of the different foot controls has several objectionable features, which were of little importance in the early days of the automotive industry, but which have become rather serious on modern high speed cars, particularly when driven in congested traffic. The most noticeable of the undesirable features is that in order to change from one control position to another, the driver has not only to move his foot from one pedal to another, but must lift the foot at the same time from a lower to a higher position. To apply the brakes for instance, the driver has to remove his right foot from its normal position on the accelerator pedal, raise the foot ordinarily about ten inches and then put it down again on the brake pedal pad before he is prepared to decelerate the machine. A similar condition of things prevails when he wants to release the clutch, for then he has to raise his foot from a position on the floor near the dimming switch button to the eight inch higher location of the pedal pad. Depending upon the agility and alertness of the driver it takes rather more than one second of time to effect this movement completely. As a car travelling at the not uncommon speed of sixty miles an hour moves approximately eighty-eight feet in one second, a considerable distance is thus covered at high speed before the driver begins to apply the brakes or release the clutch. Such an addition to the stopping distance may mean in some cases the occurrence of a serious accident.

All present day accelerator pedals are so constructed that pressing the foot downwardly increases the speed of the car. As the mere weight of the foot is ordinarily sufficient to depress the pedal, driving at comparatively moderate speeds necessitates a holding up of the foot, resulting in a slight tensioning of the leg muscles. When those muscles become somewhat tired, drivers more or less unconsciously relax that tension, and will unintensionally go faster just when proper attention demands that they should probably slow down.

Another defect of the present day foot controls is that their effective operation requires a somewhat laborious movement of the leg. To place the foot upon the pedal pad the leg has to be partly closed like a knife blade and raised, whereas the natural inclination would be just to straighten out the normally slightly bent leg without performing the actual work of raising the whole leg ten inches.

Another undesirable effect in the use of the present day foot controls is that the driver cannot keep his feet on the pedals, as the saying is "ride the pedals", for any period or length of time, which he advantageously should do to be in position prepared for instant action. The weight of the foot only is often sufficient to partly release the clutch or to slightly apply the brakes, and that is obviously detrimental to the most efficient operation of the car.

The main object of this invention is to eliminate the various objectionable features of the present foot control mechanisms as above described, by providing a construction which does not necessitate the shifting of the feet from one pedal to another, yet making an instantaneous application of the brakes conveniently practicable, and also to produce an accelerator operating combination which automatically decreases the speed of the machine whenever the driver through fatigue relaxes into the more comfortable foot position. It is also an object of this invention to devise a foot control arrangement which can be standardized and applied to all makes of cars, which will better utilize the space usually allowed for like mechanism, which will be less laborious in its operation, and which will make it possible to "ride the pedals" without injurious results with the feet normally in correct position for immediate action.

In the accompanying drawing forming a part of this application, Fig. 1 represents partly in section a side view of the front seat compartment of an automobile, showing all parts of my invention applied thereto.

Fig. 2 is a sectional view taken on the broken line A—A of Fig. 1.

Fig. 3 is a rear view of the pedal pads on line B—B, Fig. 1, with arms or levers therefor.

Throughout the drawing and description the same number is used to refer to the same part.

Considering the drawing, the frame 1 of the vehicle has the customary driver's seat in front. When occupying the seat 2, the foot 3 of the driver in its rearward position is located as shown in full lines, and the foot 4 in broken lines in Fig. 1 shows the forward or advanced position. The pedals are substantially alike, and as illustrated for pedal pad 5, each has a projecting pin 6 on its pedal pad arranged to move a lever 7 when the pedal is moved horizontally, and to correspondingly operate the control connecting link or rod 8 to the carburetor or some other engine accessory. Each pedal pad has the projections 9 and 10 to limit the sidewise movements of the pedal pad and each pedal pad pivot 20 is equipped with a spring 20' which tends to keep the pedal pad in the starting position fixed by stop 10.

The forward portion 11 of the frame 1 supports the power plant comprising the engine 12, a clutch housing 13, a transmission 14, and a steering column or post 15 terminating in the customary steering wheel 15'. On the steering column 15 are mounted the control elements which characterize my invention. Such elements may be mounted upon some other convenient portion of the vehicle structure. The body portion 16 shown in Fig. 1 in which the seat is located has the floor boards 17. The pedal pads are carried by the brake pedal arm or lever 18 and the clutch pedal pad lever 18', and each pedal usually is formed with a heel engaging terminal or heel seat 19. The invention is not limited to the shape of the pedal pad illustrated, or to the precise means described for restricting the sidewise or horizontal movement of the pedal pad. The elements herein described are obviously susceptible of modification into a variety of shapes.

The pedal pads are secured to the lower ends of the pedal levers by pivotal connections 20, which permit the driver without removing his foot to turn or twist the pedal pad in a plane horizontally, or transversely with respect to the plane of the movement of the pedal levers.

Integral with the upper end of the brake lever 18 is a lever 21, which by means of the connecting link or rod 22 operates the brake master cylinder 23 of an hydraulic brake system in the conventional manner. Similarly, integral with the upper portion of the clutch pedal lever or arm 18' is a lever arm 24 which by suitable cable link connection engages with the clutch release lever 26 on the clutch housing 13, as shown.

In Fig. 1 the pedal is shown in the rearmost position of the pedals in full lines representing their inoperative places, and the foremost or operative position of the pedals is indicated by the broken lines. The pivot pins or devices 25 of the pedal levers 18 and 18' are so located with reference to the legs of the driver that with the pedal in its foremost position a sufficient leverage exists to enable the force exerted by the leg to operate the brakes or clutch easily.

In operation the pedals describe an arc approximately like the arc traversed by the driver's foot when the leg is stretched from a bent position as shown in heavy lines in the drawing and moved naturally to the foremost position indicated by the broken lines.

When driving along at a moderate speed the driver sits in a comfortable and relaxed position with his feet on the pedal pads. Without removing his foot from the pedal, by merely twisting the right heel of his foot sidewise slightly he can regulate the speed of the vehicle, but the greater the speed the less natural becomes his foot position. If the driver gets tired, and the twist of his foot somewhat relaxes, the pedal returns to its normal position which will thus automatically decrease the speed of the car. To apply the brakes it is necessary only to straighten out the leg. As soon as the pedal concerned is moved forward, the contact between the pin on the pedal pad and the carburetor control is broken and the lever which would be actuated by the sidewise movement of the pedal pad returns into its idle position as shown in Fig. 2. A similar use can be made of the clutch pedal pad by moving it horizontally on its pivot, against the force of the spring encircling the pivot, the pivot and spring being of the same construction as pivot 20 and its spring 20', thus moving lever 7' on its fulcrum and imparting a movement to rod 8', said rod being connected with some other accessory or device, not shown, which is to be controlled by the driver. It is held to be within the scope of this invention to include means, as shown, whereby a temporary sidewise movement of the clutch pedal may operate the dimming switch or other control devices, all without removing the feet from the pedals. It is believed to have been made clear by the foregoing explanation and description, that an automobile may be driven by the occupant with his legs held in a natural and comfortable position at all times, and with his feet resting always on the pedals ready for any emergency, or for varying all controls by simple movements easily accomplished and wholly free from laborious effort. It will be further noted that the weight of the feet on the pedals does not disturb any control in any manner.

Having now described this invention and its object and operation, I claim:

1. In an automotive vehicle, a foot operated brake pedal, pivoted at a point located above the pedal pad, said pedal being constructed and arranged so that the weights of the pedal itself and of the driver's foot resting thereon tend to hold the pedal in inoperative position.

2. In an automotive vehicle, a foot operated clutch pedal, pivoted at a point located above the pedal pad, said pedal being constructed and arranged so that the weights of the pedal itself and of the driver's foot resting thereon tend to hold the pedal in inoperative position.

3. In an automotive vehicle, a foot operated brake pedal, pivoted on the steering post of said vehicle at a point located above the driver's feet, and a pedal pad constructed and arranged so that the weights of the pedal itself and of the driver's foot resting thereon tend to hold the pedal in inoperative position.

4. In an automotive vehicle, a foot operated clutch pedal, pivoted on the steering post of said vehicle at a point located above the driver's feet, and a pedal pad constructed and arranged so that the weights of the pedal itself and of the driver's foot resting thereon tend to hold the pedal in inoperative position.

5. In an automotive vehicle a foot operated control pedal, pivoted at a point located near the driver's knee, the pad of said control pedal of predetermined weight supporting the driver's foot and travelling approximately in the natural arc traversed by the operator's foot, when his leg is straightened from a normally bent position.

6. In an automotive vehicle, a foot operated pedal, pivoted at a point located above the driver's feet, said pedal being constructed and arranged so that the weights of the pedal itself and of the driver's foot resting thereon tend to hold the pedal in inoperative position, and operative connections between said pedal and another part of the vehicle, the manipulation of which by means of said pedal governs the action of the vehicle.

7. In an automotive vehicle, a foot operated pedal, pivoted at a point located above the driver's feet, said pedal being constructed and arranged so that the weights of the pedal itself and of the driver's foot resting thereon tend to hold the pedal in inoperative position, and such operative connections between said pedal and the brake, that movement of the pedal decelerates the vehicle.

8. In an automotive vehicle, a foot operated pedal, pivoted at a point located above the driver's feet, said pedal being constructed and arranged so that the weights of the pedal itself and of the driver's foot resting thereon tend to hold the pedal in inoperative position, and such operative connections between said pedal and the clutch that movement of the pedal releases the clutch.

9. In an automotive vehicle a foot operated control pedal, comprising a pedal lever pivoted at a point located above the pedal pad, said pedal being constructed and arranged so that the weights of the pedal itself and of the driver's foot resting thereon tend to hold the pedal in inoperative position, said pedal pad being movable relative to the pedal lever.

10. In an automotive vehicle a foot operated control pedal, comprising a pedal lever pivoted at a point located above the pedal pad, said pedal being constructed and arranged so that the weights of the pedal itself and of the driver's foot resting thereon tend to hold the pedal in inoperative position, said pedal pad being movable in a plane transverse to that in which the pedal lever swings.

11. In an automotive vehicle, a foot operated pedal constructed and pivoted so that the weights of the pedal itself and of the driver's foot thereon tend to hold the pedal in inoperative position, said pedal comprising a pedal lever with a movable pad, vehicle control parts located adjacent to said pad when in a specific position, said control parts being actuated by contact with a pin extension on said movable pedal pad.

12. In an automotive vehicle, a foot operated pedal constructed and pivoted so that the weights of the pedal itself and of the driver's foot thereon tend to hold the pedal in inoperative position, said pedal comprising a pedal lever with a movable pad, a fuel feed regulating device located adjacent said pedal pad when in a specific position, said device being actuated by contact with a pin extension on said movable pedal pad.

13. In an automotive vehicle, a foot operated pedal constructed and pivoted so that the weights of the pedal itself and of the driver's foot thereon tend to hold the pedal in inoperative position, said pedal comprising a pedal lever with a movable pad, lighting system control parts located adjacent said pedal pad when in its inoperative position, said control parts being actuated by contact with a pin extension on said movable pedal pad.

14. In an automotive vehicle a foot operated brake pedal pivoted on the steering post, a pedal constructed and arranged so that the weights of the pedal itself and of the driver's foot resting thereon tend to hold the pedal in inoperative position, the master cylinder of a hydraulic brake system also mounted on said steering post, and operative connections between said brake pedal and said master cylinder.

15. In a foot operated control mechanism for governing a plurality of control elements, a pedal for operating one control element, said pedal being pivoted above the driver's foot and held by its own weight in inoperative position; said pedal comprising a pedal lever and a pedal pad pivoted on that lever, means contacting the pedal pad for operating an additional control element when the pedal lever is in inoperative position as far as the first mentioned control element is concerned.

KARL FEILCKE.